United States Patent [19]

Chung

[11] 4,311,765

[45] Jan. 19, 1982

[54] POLYURETHANE SHOCK ABSORBING UNIT AND SAID POLYURETHANE

[75] Inventor: Daniel A. Chung, North Canton, Ohio

[73] Assignee: The Goodyear Tire & Rubber Company, Akron, Ohio

[21] Appl. No.: 172,622

[22] Filed: Jul. 28, 1980

[51] Int. Cl.$^3$ .......................... B32B 27/40; B61G 9/06
[52] U.S. Cl. .............................. 428/425.8; 428/423.1; 428/458; 525/418; 213/7; 267/138
[58] Field of Search ................ 428/423.1, 458, 425.8; 525/418

[56] References Cited

U.S. PATENT DOCUMENTS 2,933,478 4/1960 Young et al. ...................... 525/415
3,467,572 9/1969 Ahramjian ....................... 428/423.1
4,073,858 2/1978 Chung ........................... 428/423.1 X Primary Examiner—P. Ives
Attorney, Agent, or Firm—J. D. Wolfe

[57] ABSTRACT

Shock absorbing unit which comprises a shaped resilient polyurethane composition characterized by being able to withstand compressive cycling and particularly being characterized by retaining a high degree of rebound after a multitude of compressive cycling cycles. The unit is suitable for use in a railroad draft gear. Such polyurethane composition for said shock absorbing unit is prepared by reacting specifically selected polyols with a corresponding balance of 1,5-naphthalene diisocyanates in combination with mixtures of certain polymeric polyols with a manipulation of their molecular weights.

2 Claims, No Drawings

POLYURETHANE SHOCK ABSORBING UNIT AND SAID POLYURETHANE

TECHNICAL FIELD

This invention relates to shock absorbing units having dynamic shock absorbing ability. The invention more particularly relates to shock absorbing elements for railroad car draft gears of resilient cured polyurethane compositions which can resist softening after dynamic compressive cycling under constant compression and to a method of their preparation.

BACKGROUND ART

Railroad draft gear shock absorbing units have undergone an evolutionary state of development. Indeed, the shock absorbing material must be extremely resistant to softening under repetitive shock loads. A softened shock absorber doesn't absorb enough shock. A simple substitution of materials has been found to be ineffective.

Of particular importance is resistance to softening under demanding requirements of a dynamic compressive cycling test as a measure for determining suitable units for railroad draft gear service. This test requirement is in addition to typical deflection, low temperature and drop hammer tests involving visual destruction of a unit. Indeed, the softening test is more subtle, since a unit can soften without visual signs of disintegration. The softening determination aspect of a compressive cycling test can be exemplified by obtaining a resilient shock absorbing element comprising a resilient composition of a short cylindrical shape measuring about 16.51 centimeters in diameter and about 3.7 centimeters high with its sides in the shape of a concave V and with its ends covered and adhered to the face of circular steel plates and cycling said element under substantially constant compression alternating between a maximum of about 45 to about 55 percent of its original uncompressed polyurethane element height and a minimum of about 8 to about 12 percent of its said original height. Thus, the unit is always under some degree of compression with about 55 percent being the maximum. The force necessary to achieve the maximum compression (about 55 percent) is measured.

The polyurethane element itself constantly undergoes a very substantial change in shape as it is compressed and decompressed during each dynamic cycle. Under this relatively severe test, a typical unit can break down or crack within about 50 to about 100 cycles. However, a suitable unit for railroad draft gear service should last or withstand at least about 500 cycles.

A suitale unit for railroad draft gear service should maintain its compression resistance, or resistance to softening, by requiring at least about $37 \times 10^6$ Newtons per square meter to compress the unit 55 percent of its original uncompressed height after about 500 cycles of the compressive cycling test.

Therefore, in view of these substantial and demanding shock absorbing compressive endurance requirements, it is an object of this invention to provide an improved resilient shock absorbing unit.

DISCLOSURE AND PRACTICE OF THE INVENTION

In accordance with this invention it has been discovered that an improved shock absorbing unit comprises a shaped resilient polyurethane composition characterized by (A) withstanding compressive cycling in excess of 4000 cycles under constant compression alternating between a maximum of about 45 to about 55 percent and a minimum of about 8 to about 12 percent of its original uncompressed height, (B) requiring at least about $37 \times 10^6$ Newtons per square meter to compress said unit 55 percent of its original uncompressed height after 4000 cycles of said compressive cycling, and (C) deflecting from about 1.8 to about 2.0 centimeters at about 25° C. upon the application of about $45 \times 10^6$ Newtons per square meter uniformly to the end surface areas of the said resilient compositions in its uncompressed state when the said composition is a generally disc-shaped cylindrical element with circular parallel end surfaces, said surfaces covered and adhered to circular steel plates, having a diameter of about 16.51 centimeter, a height of about 3.7 centimeters and a sidewall connecting the end surfaces substantially in the form of a V-shaped groove having substantially equal length sides, the said groove extending between the said end surfaces, the volume of the solid portion of said element being about 150 to about 170 percent, preferably about 150 percent, of the volume of the said groove, where said resilient shock absorbing polyurethane composition is prepared by the method which comprises reacting 1,5-naphthalene diisocyanate with a blend of 15 to 25 parts of a polytetramethylene ether glycol having a molecular weight of about $1000 \pm 100$ and 35 to 45 parts of a polytetramethylene ether glycol having a molecular weight of $2000 \pm 100$ and 35 and 45 parts of a polycaprolactone ester polyol having a molecular weight of $2000 \pm 100$ to form a prepolymer having an NCO content of 3.2 to 4.0%. The prepolymer is then cured with a blend of bis(betahydroxyethyl) hydroquinone ether at an equivalent OH to NCO ratio of 0.92 to 0.98 and trimethylol propane at an equivalent OH to NCO ratio of 0.020 to 0.040.

The caprolactone ester polyols are prepared from caprolactones containing 6 to 8 carbon atoms and glycols containing 4 to 7 carbon atoms by esterification to polyols having a molecular weight of $2000 \pm 100$.

Thus, a shock absorbing unit of this invention suitable for use in a railroad draft gear comprises a shock absorbing element, the said element comprising a solid disc-shaped resilient polyurethane composition of this invention having the said characteristic compression endurance, said resistance to softening and said deflection characteristics at about 25° C. and having two opposing and substantially parallel force-receiving surfaces connected by at least one sidewall, preferably a concave sidewall, and having rigid force-receiving plates, preferably metal plates, adhered to its force-receiving surfaces. Correspondingly, the shock absorbing device of a railroad draft gear comprises a series of such units, such as about 8 to about 12 and preferably 10, loaded in a cylinder in series to the shock load, with their force-receiving plates facing against each other.

The resilient polyurethane compositions of this invention can be further characterized by a −40° C. cold temperature compression test in addition to the deflection characterization test at about 25° C. According to this test, the said composition at about −40° C. when shaped and cured to a solid circular disc with a straight sidewall having a diameter of about 2.87 centimeters and a thickness of about 1.27 centimeters, requires a maximum pressure of $34 \times 10^6$, and preferably a maximum pressure of $31 \times 10^6$ Newtons per square meter applied to its flat surfaces to compress the disc 40 percent. This cold temperature compression test is a measure of stiffening of the polyurethane composition at low temperatures. It is a measure of the composition's ability to absorb energy without hardening and transmitting shock directly without absorption. A shock absorber of this invention has essentially bottomed out when its percent compression is substantially constant and its percent compression versus load curve substantially horizontal at high load values. The quality of high energy absorption without bottoming out is particularly required for railroad draft bears which are subject to large shocks over a relatively wide range of temperatures including temperatures down to about −40° C.

Preferably the polyether polyol-polyester polyol mixture is selected from (a) a mixture of polytetramethylene ether glycols having molecular weights of about 900 to about 1100 and of about 1900 to about 2100 and the polyesters of epsilon-caprolactone and diethylene glycol having molecular weights of about 1100 to about 1400 and about 1800 to about 2200.

A feature of this invention is that the ratio of isocyanato groups of the diisocyanate to the sum of the hydroxyl groups of the polyether polyol (polytetramethylene ether glycol) and polyester polyol is from about 1.7 to about 2.5 and preferably from about 1.8 to about 2.2

It is preferred that a sufficient amount of blend of polyol curative is used to provide a ratio of hydroxyl groups to excess isocyanato groups of the diisocyanate over the sum of the hydroxyl groups of the polyether polyols and polyester polyols (reactive hydrogen-containing materials) in the range of about 0.8 to about 1 and preferably from about 0.85 to about 0.98. Thus, for example, it is desired that from about 0.18 to about 0.22 moles of the curative is added to the reaction product of the mixtures comprising correspondingly from about 1.7 to about 2.5 moles, preferably from about 1.8 to about 2.0 moles, of the diisocyanate and about 1 mole of the polyether polyol or mixture of polyether polyol and polyester polyol.

It is a further required feature of the invention that the polytetramethylene ether glycols, the caprolactone polyesters have an acid number of less than about 1, desirably less than about 0.5 and more preferably less than about 0.1.

The polytetramethylene ether glycol is of the structure and composition typically prepared from tetrahydrofuran with the aid of an alkylene oxide initiator having 2 to 4 carbon atoms, such as ethylene oxide.

The caprolactone polyesters are substantially linear, hydroxyl-terminated polymers prepared by reacting a caprolactone having 6 to about 8 carbon atoms in the ring, preferably 6 carbon atoms, with a glycol having 4 to 7 carbon atoms and preferably 4 to 6 carbons. Various suitable caprolactones include ϵ-caprolactone, zeta-caprolactone and eta-caprolactone. Alkyl substituted caprolactones can be used with alky substituents containing 1 to 2 carbon atoms selected from methyl and ethyl radicals, such as methyl ϵ-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55, respectively.

Various suitable glycols for the preparation of the polyester polyols include straight chain aliphatic hydrocarbon diols, preferably hydroxyl-terminated diols, and alkylene ether glycols, preferably hydroxyl-terminated, for preparing the carpolactone polyesters.

Respresentative of the straight chain aliphatic hydrocarbon hydroxyl-terminated diols are 1,4-butane diol, 1.5-pentane diol, 1,6-hexane diol, 1,7-heptane diol. Representative of the alkylene ether glycols is diethylene glycol. The caprolactone polyester of epsilon-caprolactone and diethylene glycol is particularly desirable. For a more detailed description of preparation of various suitable caprolactone polyesters reference is made to U.S. Pat. No. 2,933,478.

The resilient polyurethane composition can be prepared by first reacting the polyether polyol or polyether polyol and polyester polyol with the diisocyanate under substantially anhydrous conditions at a temperature of from about 100° C. to about 130° C. for about 30 to about 60 minutes. This reaction can be conducted at atmospheric or above or below atmospheric pressure. A catalyst can be added to the diisocyanate-polymeric polyol or polyol and polyester reaction mixture to reduce its reaction time.

When such a catalyst is used, it is usually added to the reaction mixture before the addition of the diisocyanate or with the addition of the diisocyanate. Various catalysts can be used exemplary of which are the amine catalysts, such as triethyl amine, n-methyl morpholine and n-ethyl morpholine.

The blend of diol-polyfunctional polyol curative is then added to and mixed with the polymeric product of this reaction sometimes called prepolymer, under essentially anhydrous conditions. The resulting polyurethane reaction mixture is then cast in a suitable mold and cured to form the shaped resilient polyurethane composition of this invention. The said reaction mixture can be cured at about 50° C. to about 80° C., although faster cures can be obtained at higher temperatures, for example, about 80° C. to about 200° C. Normally the reaction mixture is allowed to cure at 125° C. from 16 to about 24 hours.

When the shaped resilient polyurethane composition is prepared by pouring the polyurethane reaction mixture into a mold having the desired configuration and then curing the polyurethane reaction mixture, metal plates suitable for use as force-receiving plates for the shock absorbing device of this invention can be placed in the mold before curing the polyurethane reaction mixture. If desired, a suitable bonding cement such as a phenolic or polyester-polyisocyanate adhesive may be applied to the metal plates. Exemplary are the cements taught to be useful in U.S. Pat. No. 2,992,939 and Australian Pat. No. 256,373. By curing the polyurethane reaction mixture in the presence of the said metal plates, a metal plate is adhered to at least one of the force-receiving surfaces of the polyurethane member to form a laminate. Such metal plates generally conform to the planar dimensions of the members's force-receiving surfaces and have a thickness of about 100 to about 200 mils. Preferably, steel plates are used such as hot-rolled mild steel having a carbon content in the range of from about 10/15 to about 10/30 (Society of Automotive Engineer' (SAE) classification).

The practice of this invention is further illustrated by reference to the following example which is intended to be representative rather than restrictive of the scope of the invention. Unless otherwise indicated all parts and percentages are by weight.

BEST MODE FOR CARRYING OUT THE INVENTION

Example I

A castable polyurethane formulation was used which showed superior fatigue and softening resistance under dynamic cycling compressions. A draft gear pad was made from the following formulation:

| Ingredient | Parts By Weight |
|---|---|
| Polytetramethylene ether glycol (MW1000) | 20.0 |
| Polytetramethylene ether glycol (MW2000) | 40.0 |
| Polycaprolactone ester polyol (MW2000) | 40.0 |
| 2,6-Di-tert-butyl-p-cresol | 1.0 |
| 1,5 Naphthalene diisocyanate | 23.9 |
| ratio of Equivalent NCO/equivalent OH | 1.9 |
| % NCO of Prepolymer | 3.4 |
| Bis (β-Hydroxyethyl) Hydroquinone Ether pbw per 100 pbw Prepolymer | 7.71 |
| Trimethylolpropane per 100 pbw Prepolymer | 0.11 |
| Ratio of Equiv OH/Equiv NCO (Bis (β-Hydroxyethyl) Hydroquinone Ether) | 0.95 |
| Ratio of Equiv OH/Equiv NCO (Trimethylolpropane) | 0.030 |

The pad was compressed from the original 4.32 centimeters thickness to a final 2.56 centimeter. The compression was repeated every three minutes. The new pad still measured $0.82 \times 10^6$ Newtons after 467 cycles without any damage to the polyurethane. The cycling went on to 4452 cycles when the load required to compress the pad to the specified thickness still measured $0.78 \times 10$ Newtons. A second pad was made from another batch of the new formulation. The excellent cycling resistance was shown to be reproducible. The superior cycling resistance of the new pad was achieved without sacrificing other properties important to the performance of the whole shock adsorbing unit. The properties included (1) a fourth cycle load-rate measurement of between 42 and $48 \times 10^6$ Newtons/m$^2$; (2) low temperature flexibility at $-40°$ F. as measured by defelecting a 2.87 cm diameter X 1.27 cm thick pallet 40% with a force of $32 \times 10^6$ Newtons/m$^2$ or less. Detailed descriptions of how the prepolymer and the draft gear pad were prepared are presented as follows:

Prepolymer Preparation:

The three polyols were melted by heating in an oven at 150°–160° F. overnight. A two-liter resin reactor was charged with 330.0g(MW1000 polytetramethylene ether glycol), 660.0g(MW2000 polytetramethylene ether glycol) and 660.0g (MW2000 polycaprolactone ester polyol). The resin was stirred and degassed at a vacuum of less than 1 mm Hg, while the temperature was raised to 100°–105° C. Degassing at his temperature was continued for about 20 minutes to remove all the moisture in the resin. The temperature was then raised to 116° C. and 16.5g 2,6-Di-tert-butyl-p-cresol and 394.35g 1,5-naphthalene diisocyanate were immediately added to avoid prolonged exposure of the polyols at high tempertures. Degassing was resumed at once. The temperature of the reaction mixture first dipped to 102° C. and during the next ten minutes the exotherm of the isocyanatehydroxyl reaction carried the temperature to 128° C. The flask was cooled immediately to bring the temperature to about 100° C. The isocyanate content was then determined to be 3.4% as compared to the theoretical value of 3.61%.

Preparation of Draft Gear Pad

A masterbatch of 123.0g bis(β-hydroxyethyl) hydroquinone ether and 1.750g trimethylolpropane in a glass beaker was prepared by melting with occasional stirring on a hot plate. The melt solution was kept molten and its temperature stabilized in an oven at 128° C.

The curative masterbatch (54.7g) was added to 700.0g of the prepolymer. The mixture was thoroughly mixed under a vacuum and poured into a draft gear and test sample molds preheated in 128° C. oven. The polymer set up in 27 minutes. The pad and test samples were postcured at 128° C. for 24 hours.

A second pad was cast from the same prepolymer and curative materbatch. A trace of organic tin catalyst of M & T's Catalyst 125 was introduced into the curative before adding to the prepolymer. The gel time of the prepolymercurative mixture was shortened to about two minutes. At $-40°$ C. about 31 to $34 \times 10^6$ Newtons per square meter was required to compress the individual discs about 40 percent of their original thicknesses. At 24° C. such a compression required from about $15 \times 10^6$ to about $18 \times 10^6$ Newtons per square meter with a maximum of about $19 \times 10^6$ being desired.

Thus, the shock absorbing units had desirable load deflections or compressions for use in railroad draft gears for a wide range of temperatures such as from about $-20°$ C. to about 25° C. and preferably up to about 50° C.

The shock absorbing units are further desirably characterized by a $-35°$ C. hammer drop test and by an AAR endurance test as described in D. A. Chung's U.S. Pat. No. 3,929,729. Although the shock absorbing units have been described as laminates of polyurethane with metal plates of a circular shape, it should be appreciated that laminates equally useful in Westinghouse Brake shock absorbing units can be made with this polyurethane with use of rectangular metal plates which are displaced at angles of 5° to 30° in the resulting sandwich shape of the shock absorber.

While certain representative embodiments and details have been shown for the purpose of illustrating the invention, it will be apparent to those having skill in this art that certain changes and modifications may be made therein without departing from the spirit or scope of the invention.

I claim:

1. Shock absorbing unit which comprises a shaped resilient polyurethane composition characterized by (A) withstanding compressive cycling at least 4000 cycles under constant compression alternating between a maximum of about 45 to about 55 percent and a minimum of about 8 to about 12 percent of its original uncompressed height, (B) requiring at least about $37 \times 10^6$ Newtons per square meter to compress said unit 55 percent of its original uncompressed height after 4000 cycles of said compressive cycling, and (C) deflecting from about 1.8 to about 2.0 centimeters at about 25° C. upon the application of $45 \times 10^6$ Newtons per square meter uniformly to the end surface areas of the said resilient compositions in its uncompresed state when the said composition is a generally disc-shaped cylindrical element with circular parallel end surfaces, said surfaces covered and adhered to circular steel plates, having a diameter of about 16.51 cm, a height of about 3.81 centimeters and a sidewall connecting the end surfaces substantially in the form of a V-shaped groove having substantially in the form of a V-shaped groove extending between the said end surfaces, the volume of said element being about 150 percent of the volume of the said groove, where said resilient shock absorbing polyurethane composition is prepared by the method which comprises reacting a polyurethane having improved shock absorbing ability after 4000 cycles of compression at loads of $37 \times 10^6$ Newtons per square meter formed by reacting 1,5-naphtalene diisocyanate with a blend of 15 to 25 parts of a polytetramethylene ether glycol haviang a molecular weight of about $1000 \pm 100$ and 35 to 45 parts of a polytetramethylene ether glycol having a molecular weight of $2000 \pm 100$ and 35 to 45 parts of a polycaprolactone ester polyol having a molecular weight of $2000 \pm 100$ to form a prepolymer having an isocyante content of 3.2–4.0% and curing said prepolymer with a blend of bis(betahydroxyethyl) hydroquinone ether and trimethylol propane.

2. A polyurethane suitable to form shock absorbing units in laminated relationship with shaped metal plates of either circular or rectangular shape consisting essentially of reaction product of 1,5-naphthalene diisocyanate with a blend of 15 to 25 parts of a polytetramethylene ether glycol having a molecular weight of about $1000 \pm 100$ and 35 to 45 parts of a polytetramethylene ether glycol having a molecular weight of $2000 \pm 100$ and 35 to 45 parts of a polycaprolactone ester polyol having a molecular weight of $2000 \pm 100$ to form a prepolymer having an isocyanate content of 3.2–4.0% and curing said prepolymer with a blend of bis(beta-hydroxyethyl) hydroquinone ether and trimethylol propane.

* * * * *

UNITED STATES PATENT OFFICE
CERTIFICATE OF CORRECTION

PATENT NO. : 4,311,765
DATED : January 19, 1982
INVENTOR(S) : Daniel A. Chung

It is certified that error appears in the above-identified patent and that said Letters Patent are hereby corrected as shown below:

Column 5, line 33, "0.78 X 10 Newtons" should read -- $0.78 \times 10^6$ Newtons --

Column 7, line 8, "haviang" should read -- having --

Signed and Sealed this

Tenth Day of August 1982

[SEAL]

Attest:

Attesting Officer

GERALD J. MOSSINGHOFF
*Commissioner of Patents and Trademarks*